No. 769,471. PATENTED SEPT. 6, 1904.
C. EYSTER.
HARVESTING MACHINE.
APPLICATION FILED MAR. 18, 1904.
NO MODEL. 2 SHEETS—SHEET 1.

Witnesses:
R. Gertrude Southworth.
E. Behel.

Inventor:
Charles Eyster.
By A. O. Behel.
Atty

No. 769,471. PATENTED SEPT. 6, 1904.
C. EYSTER.
HARVESTING MACHINE.
APPLICATION FILED MAR. 18, 1904.
NO MODEL. 2 SHEETS—SHEET 2.
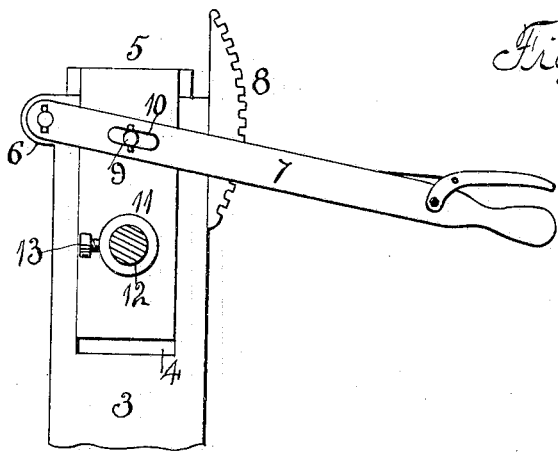
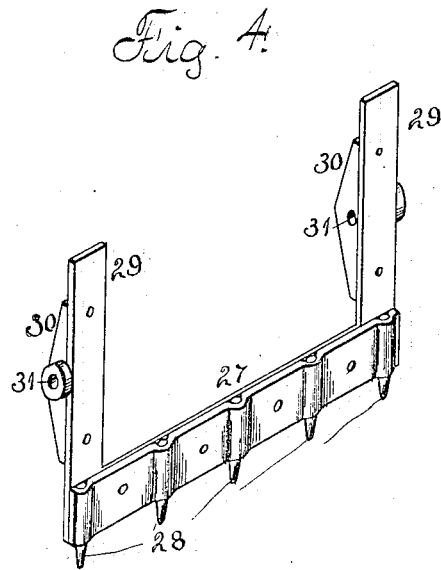

No. 769,471. Patented September 6, 1904.

UNITED STATES PATENT OFFICE.

CHARLES EYSTER, OF HOLCOMB, ILLINOIS.

HARVESTING-MACHINE.

SPECIFICATION forming part of Letters Patent No. 769,471, dated September 6, 1904.

Application filed March 18, 1904. Serial No. 198,723. (No model.)

*To all whom it may concern:*

Be it known that I, CHARLES EYSTER, a citizen of the United States, residing at Holcomb, in the county of Ogle and State of Illinois, have invented certain new and useful Improvements in Harvesting-Machines, of which the following is a specification.

The object of this invention is to lift up downfallen grain and present it to the knife in an erect position.

Figure 1:
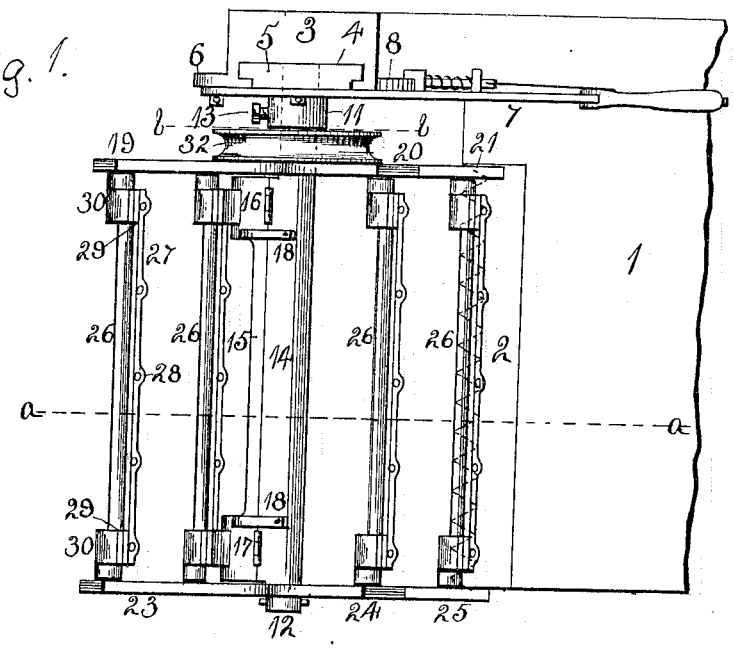
Figure 2:
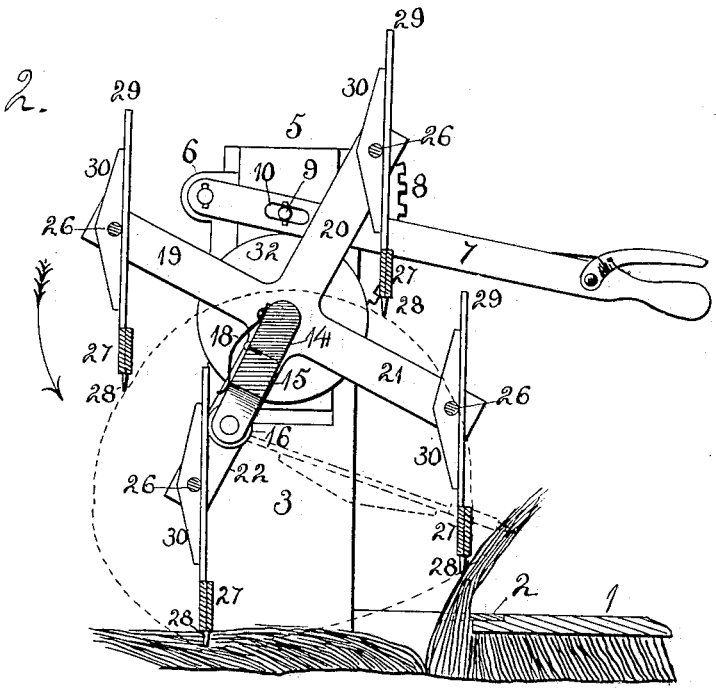

In the accompanying drawings, Figure 1 is a plan view of my improvements, shown in connection with a cutter-bar and platform. Fig. 2 is a vertical section on dotted line $a$, Fig. 1. Fig. 3 is a vertical section on dotted line $b$, Fig. 1. Fig. 4 is an isometrical representation of one of the rakes.

The platform 1 supports a cutter-bar 2 in the usual manner. This platform supports a post 3. This post 3 has a grooveway 4 extending in its lengthwise direction, within which is located a guide 5 and fitted to slide therein. From the post extends an ear 6, to which is pivoted a lever 7. A toothed segment 8 is supported by the post, and the lever 7 is provided with the usual dog and thumb-lever engagement with the toothed segment. A stud 9 extends from the guide 5 and is located in a slot 10, formed in the lever 7, thereby forming a connection between the lever and guide, so that by a movement of the lever the guide can be moved in its grooved support and held in its adjusted position.

A boss 11 extends from the guide 5, within which is located a shaft 12 and held in connection therewith by the set-screw 13. The center portion of this shaft 12 has a depending enlargement 14, to which is hinged an extension 15. Two rollers 16 and 17 are supported by the extension 15, one near each end. Two flat springs 18 have a connection with the enlargement 17, and their free ends rest in contact with the extension, which holds the extension in line with the enlarged portion in a yielding manner.

Upon the shaft 12 between the boss 11 and the enlargement 14 is mounted a frame comprising the arms 19, 20, 21 and 22, and upon the free end of the shaft is mounted a frame comprising the arms 23 24 25 and an arm corresponding to arm 22. (Not shown.) The arms of these frames are connected by rods 26. From each rod is suspended a rake (shown at Fig. 4) comprising a horizontal section 27, supporting teeth 28, and two end arms 29, having bearings 30, each provided with an opening 31. The rods 26 are passed through the openings 31 in the bearings, thereby supporting the rakes in a manner permitting of a swinging movement. That end of the rake supporting the cross-bar is heavier than the other end. Therefore the rake will hang in a vertical position.

A pulley 32 is connected to the arms 19, 20, 21, and 22, and when driven through a connection with other parts of the harvester a rotary movement will be imparted to the frames in the direction indicated by the arrow. As the frames are rotated the rakes will be carried by them, and they would always stand in a vertical position were it not for the location of the rollers 16 and 17 in the path of the movement of the upper sections of the end arms 29. At Fig. 2 is shown in dotted lines the irregular path traversed by the teeth of the rakes, and also in dotted lines is shown the position of one of the rakes as it is leaving the rollers.

In use the frames are rotated as the machine advances over the ground, and when the upper ends of the rakes come in contact with the rollers 16 and 17 their lower portions will be moved toward the cutter-bar, at the same time being elevated until the teeth are in rear of the knife, at which point the upper ends of the rakes will have passed free of the rollers, when they will assume a vertical position. The movement of the rakes from the time they engage the rollers until they are free thereof will enter the down grain, raise it, and present it to the knife in substantially a vertical position, as shown at Fig. 2.

By hinging the extension 15 to the enlargement 14 should the frames carrying the rakes revolve backward they might become cramped, but the yielding extension will prevent breakage of the parts. By means of the set-screw 13 the shaft may be liberated and turned axially and again secured. By turning the shaft the rollers 16 and 17 can be adjusted so that the rakes will come in contact therewith sooner or later, thus regulating the point at which the teeth will enter the grain and the distance the teeth will carry the grain rearward. By means of the hand-lever the reel as a whole can be raised and lowered to suit the conditions of the grain.

I claim as my invention—

1. In a harvesting-machine, the combination of a suitable frame, a cutter-bar, a shaft supported by the frame, two end frames connected by rods and supported by the shaft in a manner to rotate thereupon, a series of rakes each suspended from a rod and having a portion extending above the rod, a projection supported by the shaft, an extension having a hinge connection with the projection, and located in the path of the movement of the upper portions of the rakes whereby the rakes are raised when revolved in one direction and prevented from breaking when revolved in the opposite direction.

2. In a harvesting-machine, the combination of a suitable frame, a cutter-bar, a shaft supported by the frame, two end frames connected by rods and supported by the shaft in a manner to rotate thereupon, a series of rakes each suspended from a rod and having a portion extending above the rod, a projection supported by the shaft, an extension having a hinge connection with the projection and located in the path of the movement of the upper portions of the rakes, a roller supported by the hinged extension.

3. In a harvesting-machine, the combination of a suitable frame, a cutter-bar, a shaft supported by the frame, two end frames connected by rods and supported by the shaft in a manner to rotate thereupon, a series of rakes each suspended from a rod and having a portion extending above the rod, a projection supported by the shaft, an extension having a hinge connection with the projection and located in the path of the movement of the upper portions of the rakes, a spring holding the extension in operative position in connection with the projection.

4. In a harvesting-machine, the combination of a suitable frame, a cutter-bar, a shaft supported by the frame, two end frames connected by rods and supported by the shaft in a manner to rotate thereupon, a series of rakes each suspended from a rod and having a portion extending above the rod, a projection supported by the shaft, an extension having a hinge connection with the projection and located in the path of the movement of the upper portions of the rakes, a roller supported by the hinged extension, a spring holding the extension in operative position in connection with the projection.

5. In a harvesting-machine, the combination of a suitable frame, a cutter-bar, a shaft supported by the frame two end frames connected by rods and supported by the shaft in a manner to rotate thereupon, a series of rakes each suspended from a rod and having a portion extending above the rod, and each having a lower bar and two end bars, teeth supported by the lower bar, a projection supported by the shaft, an extension having a hinge connection with the projection, and located in the path of the movement of the upper portions of the rakes, whereby the rakes are raised when revolved in one direction, and prevented from breaking when revolved in the opposite direction.

CHARLES EYSTER.

Witnesses:
C. E. Oakes,
A. O. Behel.